June 17, 1930. E. C. HALL 1,764,624
METHOD OF COATING MATERIAL
Filed Sept. 16, 1926
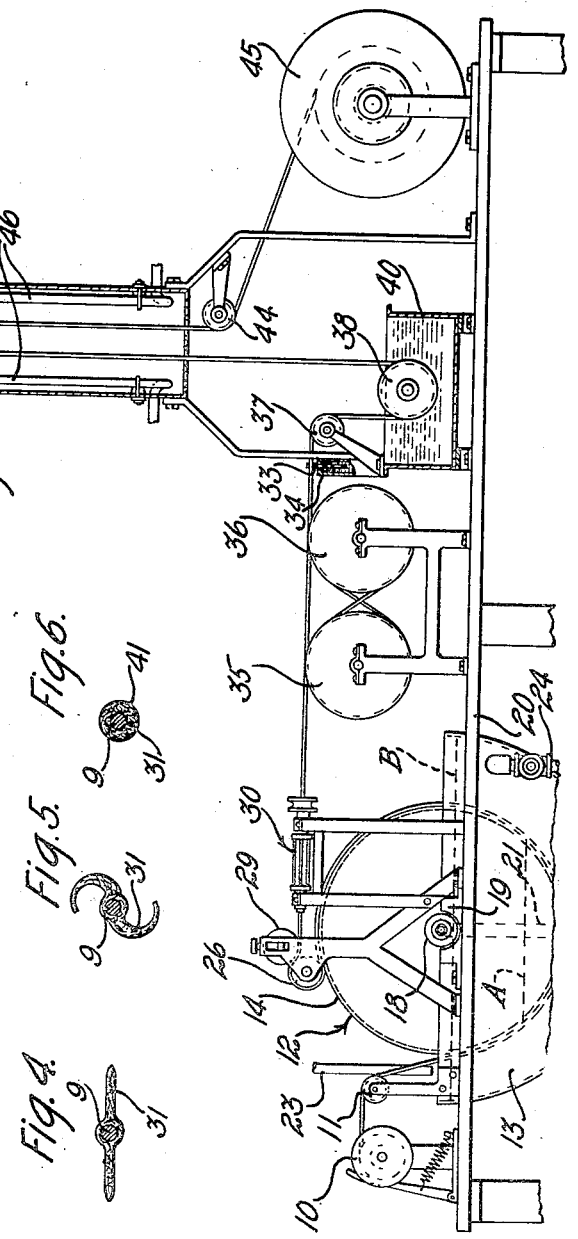
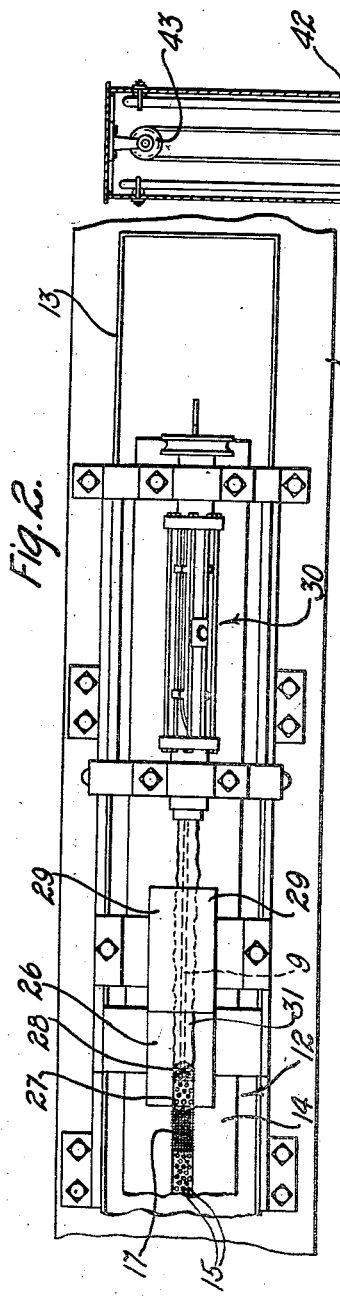
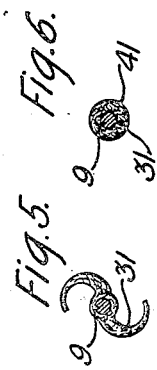
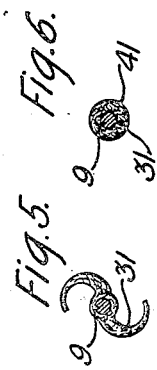
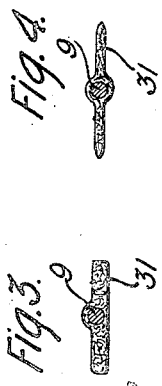
Inventor
Earl C. Hall
by H. A. Patterson
Att'y.

Patented June 17, 1930

1,764,624

UNITED STATES PATENT OFFICE

EARL C. HALL, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF COATING MATERIAL

Application filed September 16, 1926. Serial No. 135,720.

This invention relates to a method of coating material, and more particularly to a method of applying a surface coating upon fibrous material.

The object of the invention is to provide a simple and efficient method of applying a coating upon a fibrous material.

In accordance with one embodiment of the invention, the material to be coated is saturated with a liquid which is readily absorbed by the fibres of the material. The saturated material is then subjected to a solution including a coating substance which is insoluble in the liquid employed in the saturating process. Due to the material being saturated with the liquid, the coating substance is prevented from penetrating into the fibres of the material, thus causing a film of the coating substance to be formed upon the surface of the material. The material thus coated is then subjected to a drying process whereby the excess liquid is removed therefrom.

In accordance with another embodiment of the invention, the material to be coated is not saturated preliminary to being subjected to the coating solution but is subjected in a partially or substantially dry state to a mixture of a coating substance and a liquid which is a non-solvent for the coating substance and which is readily absorbed by the fibres of the material to be coated. Due to the rapid absorption of the liquid by the fibres of the material the coating substance is precipitated upon the surface of the material, thus producing a surface coating thereon. The excess liquid is then removed by a drying process.

When employing the present method for producing a core having a fibrous coating which is impervious to moisture, the core is subjected to a liquid containing pulp in such manner that pulp is applied thereto and retained thereon by an intermingling of the pulp fibres. The pulp is then formed around the core to constitute a coating therefor and the pulpous coating is dried and then subjected to a mixture of a waterproofing substance and a liquid which is a non-solvent for the waterproofing substance and which is readily absorbed by the fibres of the material to be coated. Due to the rapid absorption of the liquid by the fibrous material, the waterproofing substance is precipitated upon the surface of the material, thus causing a film of the waterproofing substance to be formed upon the surface of the material. The excess liquid is then removed by a further drying process.

The present method may be employed to advantage in conjunction with the insulating of electrical conductors, but it is to be understood that the invention is not limited to this purpose but only in so far as defined by the appended claims. Where the method is used in the insulating of electrical conductors, manila, wood, rag, cotton, esparto, jute, hemp and asbestos pulps may be employed as the insulating material, but other materials than those specified may be used without departing from the spirit and scope of the present invention which contemplates in its broadest aspect, the applying of a coating upon a fibrous material.

The word "pulp" as used in the specification and claims is to be understood as defining and including any cohering fibrous mass whether suspended in a liquid, moist or substantially dry.

It is believed that the improved method will be clearly understood from the following detail description of an apparatus by which the method may be practiced.

In the accompanying drawing,

Fig. 1 is a side elevation, partly in section, showing an apparatus by which the present method may be practiced in conjunction with the insulating of electrical conductors;

Fig. 2 is an enlarged fragmentary plan view of a portion of the apparatus shown in Fig. 1;

Figs. 3 and 4 are enlarged sectional views showing the formation of the pulp on the core before and after passing between the squeezing rolls, respectively, and Figs. 5 and 6 are enlarged sectional views showing the formation of the pulp coating during and after the forming operation, respectively.

The apparatus herein disclosed for performing the improved method is particularly adapted for coating cores in strand form, but it is to be understood that other apparatus may be devised for coating cores in other forms and still be within the scope of the present invention.

Referring now to the drawing in detail in which like reference characters designate corresponding parts throughout the several views, a core 9 is fed from a supply 10 over an idler roll 11 and thence around a drum 12 which is partially submerged in a liquid containing pulp within a semi-cylindrical trough 13. The drum 12 comprises a pair of sheet metal sides and a peripheral portion 14 secured thereto. The peripheral portion 14 is provided with a plurality of relatively large perforations 15 which are covered with a narrow strip of fine wire mesh 17 (Fig. 2). The drum 12 has a centrally disposed tubular axle 18 which is rotatably mounted in suitable bearings 19 carried by a framework 20 which supports all of the elements of the apparatus.

In order to apply pulp to the core as it passes over the drum 12 the liquid within the drum is maintained at a lower level than that of the pulp mixture in the trough 13, as indicated by the dotted lines A and B respectively. This difference in level is maintained by a siphon pipe 21 which has its inlet opening submerged in the liquid within the drum 12 and its discharge through the tubular axle 18. A continuous circulation of the pulp mixture is maintained in the trough 13 by feeding the pulp mixture from a supply tank (not shown) into the trough 13 by means of a pipe 23, and out of the said trough through a pipe 24 into a receiving tank (not shown) from which it is pumped back into the supply tank in any suitable manner. As the drum 12 is rotated within the trough 13 the liquid in the tank passes through the wire mesh 17 straining the pulp onto the outer surface thereof and applying pulp to the core supported thereon.

The drum 12 is rotated in a counter-clockwise direction (Fig. 1) and the core with the pulp applied thereon passes from the top of the drum onto a felt covered roll 26 which is disposed in contact with the wire mesh 17. The periphery of the roll 26 has a foraminous portion 27 which is covered by a fine wire mesh 28 (Fig. 2) and as the core and its attached pulp passes between the drum 12 and the roll 26, the "free liquid", so to speak, in the pulp mixture is squeezed out partially through the foraminous portion of the drum 12 and partially through the felt and the foraminous portion of the roll 26. The partially dried pulp adheres to the felt of the roll 26 in the form of a ribbon 31 with the core centrally located therein as illustrated in Fig. 3.

After passing partially around the felt covered roll 26 the core with its attached ribbon of pulp passes between the roll 26 and a companion roll 29, the latter roll being provided with suitable tension means which serves to press it against the roll 26 whereby additional moisture is squeezed from the ribbon of pulp and the fibres in the pulp are pressed closer together and to the core as shown in Fig. 4.

From the squeezing rolls the core with its attached ribbon of pulp passes through a forming mechanism 30 which wraps the projecting edges of the pulp ribbon around the core and around each other. The appearance of the coating after it is first acted upon by the forming mechanism is illustrated in Fig. 5 and its appearance after the forming operation has been completed is illustrated in Fig. 6. The forming mechanism 30 may be of the type fully illustrated and described in Patent No. 1,615,416 granted January 15, 1927, to H. G. Walker and A. T. March, and reference is made to such patent for a detailed description of this mechanism.

After being drawn through the forming mechanism the core with its formed fibrous coating may be subjected to a drying operation. The means shown for performing this operation comprises a pair of wide internally heated hollow drums 35 and 36 having a plurality of grooves (not shown) which receive the core, guides (not shown) being provided for directing the core over first one drum and then the other until it has traversed all of the grooves of both drums.

In accordance with one embodiment of the invention, the pulp coated core is drawn from the drying means over a wick 33 submerged in a liquid, such as water, contained in a receptacle 34. Due to the rapid absorption of the liquid by the pulp fibres, the pulpous coating becomes thoroughly saturated with the liquid as the core passes over the wick 33. The core with the saturated coating is then passed over an idler roll 37 and around a drum 38 which is partially submerged in a coating substance contained in a tank 40.

Various kinds of coating substances, such as cellulose acetate, cellulose nitrate, varnishes, etc., may be used in accordance with the particular character of surface coating which is to be applied upon the pulp coating. In practice satisfactory and beneficial results have been obtained when the material to be coated is saturated with a liquid such as water, which is a non-solvent for the coating substance.

As the pulp covered core passes through the coating substance contained in the tank 40, the penetration of the coating substance into the fibres of the pulp is prevented due to the coating being thoroughly saturated with the liquid from the receptacle 34. This causes a film 41 (Fig. 6) of the coating substance to be formed upon the surface of the pulp coating. The core thus coated is then subjected to a drying process to remove the excess liquid therefrom.

As illustrated in the drawing, the coated core is drawn from the coating substance and passed upwardly through a drying oven 42, over an idler pulley 43, and then downwardly and over an idler pulley 44 from which it is stored upon a suitable take-up reel 45. It should be understood that the core may be passed up and down through the oven any number of times desired, a single pass being illustrated merely for the sake of simplicity. The oven 42 may be heated by steam pipes 46 or by any other suitable means. In some instances it may be found necessary to pass the core through the coating solution several times in order to obtain an uninterrupted surface coating.

In accordance with another embodiment of the invention, the pulpous coating is not saturated preliminary to being subjected to the coating solution but may be subjected in a partially or substantially dry state to a mixture of a coating substance and a liquid which is a non-solvent for the coating substance and which is readily absorbed by the fibres of the pulp coating. A mixture which gives very satisfactory results when employed in this method comprises a mixture of a cellulose ester, such as cellulose acetate, in water. Due to the rapid absorption of the liquid by the pulp fibres, the coating substance is precipitated upon the surface of the pulp thus producing a surface coating thereon. The excess liquid is then removed by a drying process in the manner hereinbefore described.

Although the pulp and surface coatings are herein illustrated and described as applied on the core in a continuous process, it should be understood that the pulp coated core may be drawn from the drying means and stored upon suitable take-up reels (not shown) after which it may be unwound from the take-up reels and a surface coating applied thereon in the manner hereinbefore described.

What is claimed is:

1. A method of applying a coating upon a fibrous material, consisting in subjecting the material to a mixture of a coating substance and a liquid which is a non-solvent for said coating substance and which is readily absorbed by the fibrous material, whereby the liquid is absorbed by the fibrous material and the coating substance is retained upon the surface thereof thereby forming a surface coating thereon.

2. A method of applying a coating upon a fibrous material, consisting in subjecting the material to a mixture of a coating substance and a liquid which is a non-solvent for said coating substance and which is readily absorbed by the fibrous material, whereby the liquid is absorbed by the fibrous material and the coating substance is retained upon the surface thereof thereby forming a surface coating thereon, and then removing the excess liquid from the material.

3. A method of applying a coating upon a fibrous material, consisting in immersing the material in a mixture consisting solely of cellulose acetate and a liquid which is a non-solvent therefor.

4. A method of applying a surface coating upon a fibrous material, consisting in subjecting the material to a mixture of cellulose acetate and a liquid which is a non-solvent therefor, and then subjecting the material to a drying process to remove the excess liquid therefrom.

5. A method of applying a coating upon a fibrous material, consisting in immersing the material in a mixture consisting solely of water and cellulose acetate.

6. A method of applying a surface coating upon a fibrous material, consisting in subjecting the material to a mixture of water and cellulose acetate, and then removing the excess water from the material.

7. A method of applying a surface coating upon a fibrous material, consisting in subjecting the material to a mixture of water and a coating substance which is not soluble in water, and then subjecting the material to a drying process to remove the excess water therefrom.

8. A method of applying a waterproof coating upon a fibrous material, consisting in subjecting the material to a mixture of a waterproofing substance and a liquid which is a non-solvent therefor and which is readily absorbed by the fibrous material, whereby the liquid is absorbed by the fibrous material and the coating substance is retained upon the surface thereof thereby forming a surface coating thereon.

9. A method of applying a waterproof coating upon a fibrous material, consisting in subjecting the material to a mixture of a waterproofing substance and a liquid which is a non-solvent therefor and which is readily absorbed by the fibrous material, whereby the liquid is absorbed by the fibrous material and the coating substance is retained upon the surface thereof thereby forming a surface coating thereon, and then removing the excess liquid from the material.

10. A method of coating a core consisting in applying a pulp coating to the core and then subjecting the pulp coating to a liquid which is readily absorbed by the pulp and a coating substance which is insoluble in the liquid whereby the liquid is absorbed by the pulp and the coating substance is retained on the surface of the pulp coating 11. A method of coating a core, consisting in subjecting the core to a liquid containing pulp in such manner that pulp is applied thereto, and then applying a surface coating upon the pulp by subjecting it to a mixture of a coating substance and a liquid which is a non-solvent therefor.

12. A method of coating a core consisting in applying a pulp coating to the core, subjecting the pulp coating to a liquid which is readily absorbed by the pulp and a coating substance which is insoluble in the liquid whereby the liquid is absorbed by the pulp and the coating substance is retained on the surface of the pulp coating thereby forming a surface coating thereon, and then treating the pulp coating so as to remove the excess liquid therefrom.

13. A method of coating a core, consisting in subjecting the core to a liquid containing pulp in such manner that pulp is applied thereto, applying a surface coating upon the pulp by subjecting it to a mixture of a coating substance and a liquid which is a non-solvent therefor, and then removing the excess liquid from the pulp.

14. A method of coating a core, consisting in subjecting the core to a liquid containing pulp in such manner that pulp is applied thereto, forming the pulp around the core to constitute a coating therefor, subjecting the coating to a waterproofing substance including cellulose acetate and a liquid which is a non-solvent therefor, and then removing the excess liquid therefrom.

15. A method of coating a core in strand form, consisting in subjecting the core to a liquid containing pulp in such manner that pulp is applied thereto and caused to cling to the core solely by an intermingling of the pulp fibres, forming the pulp around the core to constitute a coating therefor having a curved outer surface, subjecting the pulp coating to a waterproofing substance including cellulose acetate and water, and then subjecting the coating to a drying process to remove the excess water.

16. A method of coating a core in strand form, consisting in applying unfinished paper to the core, completing the fabrication of the unfinished paper on the core to constitute a coating therefor, subjecting the coating to a waterproofing substance including cellulose acetate and water, and then subjecting the coating to a drying process to remove the excess water therefrom.

17. A method of coating a core in strand form, consisting in applying unfinished paper to the core, completing the fabrication of the unfinished paper on the core to constitute a coating therefor, subjecting the coating to a mixture of a water-proofing substance and a liquid which is a non-solvent therefor, and then subjecting the coating to a drying process to remove the excess liquid therefrom.

18. A method of applying a coating upon a fibrous material, consisting in immersing the material in a mixture of liquid cellulose and water, and then causing the evaporation of the water from the material.

19. A method of applying a coating upon a pulp covered core, consisting in immersing the covered core in a mixture of liquid cellulose and water, and then causing the evaporation of the water from the covered core.

In witness whereof, I hereunto subscribe my name this 30th day of August A. D., 1926.

EARL C. HALL.